Figure 1:
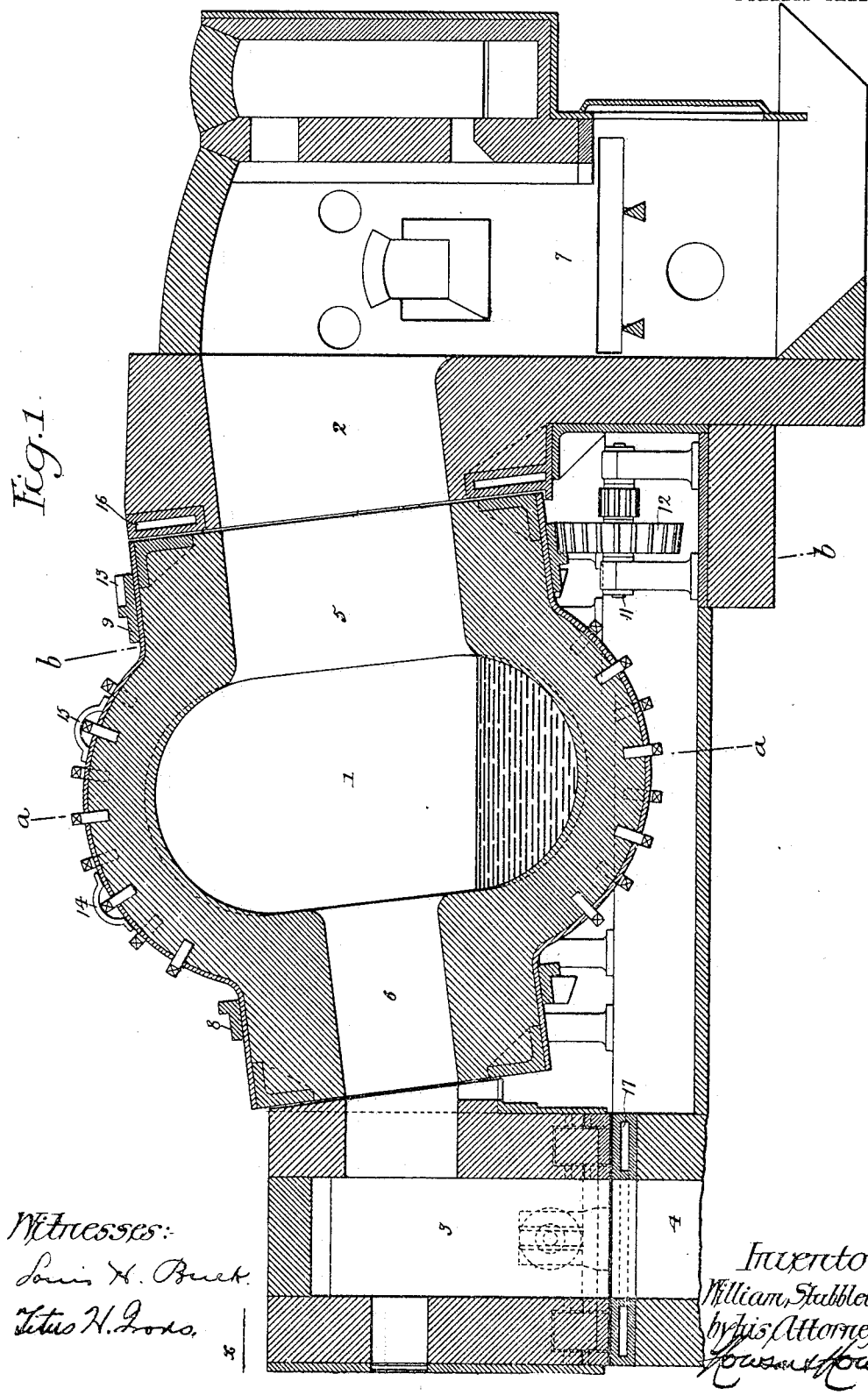

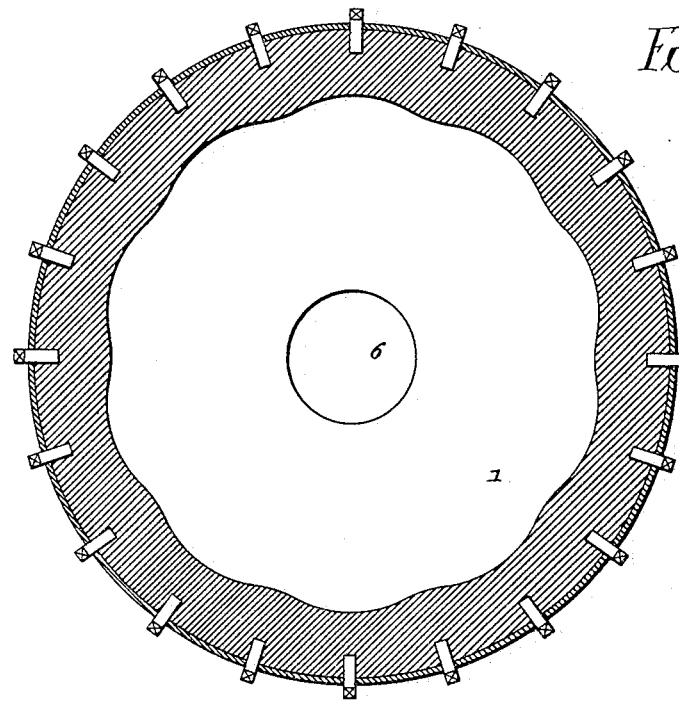
Fig.2.
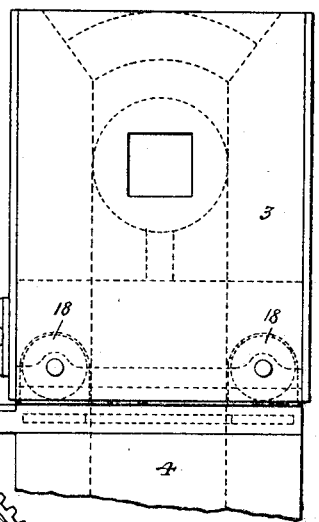
Fig.4.
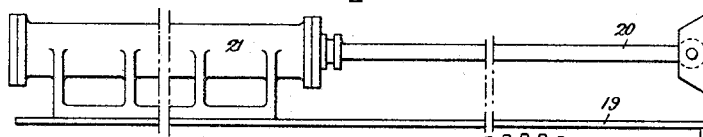
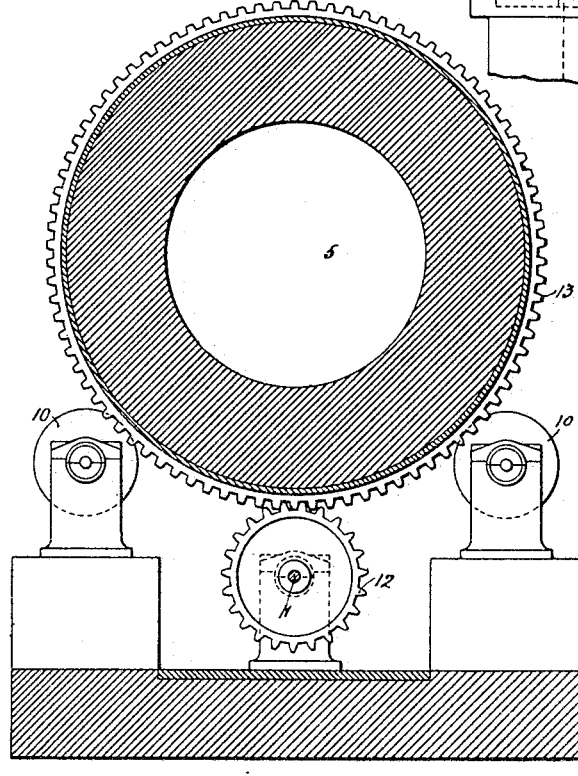
Fig.3.

No. 782,082.                                              Patented February 7, 1905.

UNITED STATES PATENT OFFICE.

WILLIAM STUBBLEBINE, OF BETHLEHEM, PENNSYLVANIA.

ROTARY PUDDLING OR BUSHELING FURNACE.

SPECIFICATION forming part of Letters Patent No. 782,082, dated February 7, 1905.

Application filed July 16, 1904. Serial No. 216,840.

*To all whom it may concern:*

Be it known that I, WILLIAM STUBBLEBINE, a citizen of the United States, and a resident of Bethlehem, Pennsylvania, have invented certain Improvements in Rotary Puddling or Busheling Furnaces, of which the following is a specification.

The object of my invention is to so construct a rotary puddling or busheling furnace or a furnace for treating scrap metal as to provide for the effective heating of the metal therein and the convenient filling and emptying of the rotary vessel in which the treatment is effected. This object I attain in the manner hereinafter set forth, reference being had to the accompanying drawings, in which—

Figure 1 is a longitudinal section of a rotary puddling-furnace constructed in accordance with my invention. Fig. 2 is a transverse section of the same on the line $a\ a$, Fig. 1. Fig. 3 is a transverse section on the line $b\ b$, Fig. 1; and Fig. 4 is a view of one of the end structures of the furnace looking in the direction of the arrow $x$, Fig. 1.

The furnace structure consists of a rotary vessel 1 for containing the supply of metal, an inlet structure 2 for supplying products of combustion to said structure 1, and an outlet structure 3 for receiving the products of combustion therefrom and directing them to the flue 4, whereby they are conveyed to the regenerator, stack, or other point at which they are to be further utilized or discharged.

The vessel 1 resembles a sphere flattened at the ends, one end constituting the receiving-neck 5 and the other end the discharge-neck 6, the vessel having a suitably-strengthened or reinforced sheet-metal casing lined with fire-brick or other refractory material, which extends into the necks 5 and 6, the central opening of the receiving-neck being considerably larger in diameter than that of the discharge-neck of the vessel, so as to provide for the free entry of a large volume of the products of combustion from the fireplace or other means employed for supplying such products of combustion. The central or metal-receiving chamber 1 of the furnace has the inner face of its lining corrugated, as shown in Fig. 2, so that as the vessel is rotated constant agitation of the metal contained in said chamber will be effected.

The structure for supplying the products of combustion to the furnace 1 is in the present instance provided with a fireplace 7 for burning coal; but said structure may receive a supply of gas from an ordinary gas-producer, or the products of combustion may be derived from an oil-burner or other generator without departing from my invention. The axis of the rotating puddling vessel 1 is inclined in respect to the horizontal, the receiving end being uppermost, and the case of the furnace is provided with annular rails 8 and 9, which are supported upon rollers 10, mounted in suitable bearings on each side of the furnace, rotating movement being imparted to the vessel 1 from a shaft 11, which has a bevel-wheel 12 meshing with an annular rack 13 on the vessel, rotating movement being imparted to said shaft 11 in any appropriate manner.

The casing of the vessel 1 is provided with eyes 14 and 15, located on opposite sides of the longitudinal center of the vessel, so that the latter may be suspended, by means of independent chains or other connections, from a suitable crane-trolley, whereby the vessel may be raised or lowered by lifting both chains at the same speed or caused to tip or tilt in either direction by lifting one chain faster than the other.

The outer faces of the receiving and discharge necks 5 and 6 of the vessel 1 fit with comparative closeness to the adjoining faces of the supply and discharge structures 2 and 3, and in order to prevent said supply structure 2 from becoming so hot as to cause it to adhere to the outer face of the neck 5 of the puddling vessel said structure 2 may be provided with a water-cooled ring 16, as shown in Fig. 1, a similar water-cooled ring 17 surrounding the mouth of the flue 4, so as to prevent the discharge structure 3 from adhering thereto. The said discharge structure 3 is provided with rollers 18, running upon a track 19, and it is connected to the piston-rod 20 of a power-cylinder 21, so that said structure 3 can be moved longitudinally into or out of alinement with the discharge-neck 6 of the puddling vessel.

In the operation of the furnace the puddling vessel receives its load of metal while suspended from the crane-trolley and is then moved into position in front of the structure 2, the structure 3 in this case being moved out of the way. By proper operation of the suspension-chains the vessel 1 is properly adjusted in respect to the structure 2 and is finally deposited upon its supporting-rollers 10, so that the rack 13 will be in mesh with the driving-pinion 12. The structure 3 is then moved into position at the end of the puddling vessel, and the products of combustion are then permitted to flow through the latter, to which constant rotating movement is imparted, so as to cause agitation of the mass of molten metal in the chamber 1.

By disposing the axis of the vessel 1 at an angle in respect to the horizontal with the enlarged opening in the receiving-neck uppermost the capacity of the treating-chamber of the vessel is materially increased as compared with a vessel of the same character, but having its axis horizontal, as will be readily understood by reference to Fig. 1 of the drawings.

Having thus described my invention, I claim and desire to secure by Letters Patent—

1. A rotary puddling, busheling or scrapping furnace having a treating vessel mounted so as to rotate about its longitudinal axis, said axis being inclined in respect to the horizontal, and said vessel having a gas-inlet at one end and a gas-outlet at the other, the gas-inlet being uppermost and being of greater area than the gas-outlet, substantially as specified.

2. A rotary puddling, busheling or scrapping furnace having a treating vessel provided with means whereby it can be mounted so as to rotate about its longitudinal axis, and having a gas-inlet at one end and a gas-outlet at the other, said vessel being provided with suspending means on opposite sides of the center of its longitudinal axis and independent of the driving mechanism whereby it may be raised and lowered and tipped or tilted by means of the suspending mechanism, substantially as specified.

In testimony whereof I have signed my name to this specification in the presence of two subscribing witnesses.

WILLIAM STUBBLEBINE.

Witnesses:
 GEO. L. BAUM,
 GEO. L. FRICK.